US007341482B2

(12) United States Patent
Ngo

(10) Patent No.: US 7,341,482 B2
(45) Date of Patent: Mar. 11, 2008

(54) STRAIN RELIEF FOR BALL GRID ARRAY CONNECTORS

(75) Inventor: Hung Viet Ngo, Harrisburg, PA (US)

(73) Assignee: FCI Americas Technology, Inc., Reno, NV (US)

( * ) Notice: Subject to any disclaimer, the term of this patent is extended or adjusted under 35 U.S.C. 154(b) by 0 days.

(21) Appl. No.: 11/051,361

(22) Filed: Feb. 4, 2005

(65) Prior Publication Data

US 2006/0178037 A1 Aug. 10, 2006

(51) Int. Cl.
*H01R 13/73* (2006.01)
*H02B 1/01* (2006.01)

(52) U.S. Cl. ........................................ 439/566; 439/563

(58) Field of Classification Search ................ 439/566, 439/563, 570, 571, 463, 64, 469, 567
See application file for complete search history.

(56) References Cited

U.S. PATENT DOCUMENTS

| | | | | |
|---|---|---|---|---|
| 3,582,867 | A | | 6/1971 | Thompson ................... 339/92 |
| 3,701,071 | A | | 10/1972 | Landman ....................... 339/4 |
| 3,714,617 | A | | 1/1973 | Bright et al. ............... 339/186 |
| 4,076,165 | A | * | 2/1978 | Latasiewicz et al. ........ 228/136 |
| 4,277,126 | A | | 7/1981 | Lincoln ...................... 339/186 |
| 4,659,156 | A | | 4/1987 | Johnescu et al. ............ 339/17 |
| 4,693,528 | A | * | 9/1987 | Asick et al. .................. 439/83 |
| 4,726,791 | A | | 2/1988 | Rudy, Jr. et al. ............ 439/677 |
| 4,820,169 | A | | 4/1989 | Weber et al. ................. 439/65 |
| 4,925,400 | A | | 5/1990 | Blair et al. ................. 439/374 |
| 5,055,055 | A | | 10/1991 | Bakker ........................ 439/78 |
| 5,120,256 | A | * | 6/1992 | Walden ...................... 439/553 |
| 5,173,063 | A | | 12/1992 | Barkus et al. .............. 439/681 |
| 5,411,236 | A | * | 5/1995 | Morita et al. ............... 248/500 |
| 5,415,565 | A | * | 5/1995 | Mosquera .................... 439/567 |
| 5,462,454 | A | * | 10/1995 | Kramer et al. .............. 439/571 |
| 5,533,908 | A | * | 7/1996 | Henry et al. ................ 439/329 |
| 5,893,764 | A | * | 4/1999 | Long ............................ 439/79 |
| 6,059,600 | A | | 5/2000 | Vanbesien ................... 439/378 |
| 6,162,090 | A | * | 12/2000 | Klubenspies et al. ....... 439/564 |
| 6,168,463 | B1 | * | 1/2001 | Wu ............................ 439/567 |
| 6,227,906 | B1 | * | 5/2001 | Fan ............................ 439/570 |
| 6,319,021 | B1 | | 11/2001 | Billman ....................... 439/78 |
| 6,319,058 | B1 | * | 11/2001 | Jones ......................... 439/567 |
| 6,331,122 | B1 | * | 12/2001 | Wu ............................ 439/567 |

(Continued)

FOREIGN PATENT DOCUMENTS

| | | | |
|---|---|---|---|
| DE | 10243407 A1 | * | 4/2004 |
| EP | 0 273 683 B1 | | 3/1993 |
| JP | 6-236788 | | 8/1994 |
| JP | 7-114958 | | 5/1995 |
| JP | 2000-003743 | | 1/2000 |

(Continued)

*Primary Examiner*—Hae M Hyeon
(74) *Attorney, Agent, or Firm*—Woodcock Washburn LLP

(57) ABSTRACT

Strain relief devices for electrical connectors are disclosed and include an insert for insertion into a housing. The insert may include spring beams that deflect during insertion into the strain relief housing. When the insert is fully received in the housing, a slot in the housing may be shaped such that the spring beams return to a relaxed state, locking the insert in the housing. Alternatively, an end of a strain relief insert may be inserted into the housing until beams on the strain relief insert abut shoulders in the slot in the housing. The end may protrude beyond the housing, creating a tab that may be deformed or bent to prevent the insert from moving in a direction opposite the direction of insertion.

31 Claims, 9 Drawing Sheets

U.S. PATENT DOCUMENTS

| | | | | |
|---|---|---|---|---|
| 6,632,107 | B1 | 10/2003 | Vanbesien | 439/680 |
| 6,638,106 | B1 * | 10/2003 | Wu | 439/567 |
| 6,722,920 | B2 * | 4/2004 | Zhang | 439/571 |
| 6,796,835 | B2 * | 9/2004 | Wu | 439/567 |
| 6,805,278 | B1 | 10/2004 | Olson et al. | 228/180.22 |
| 7,048,576 | B2 * | 5/2006 | Nakano | 439/570 |
| 7,217,151 | B2 | 5/2007 | Geibel et al. | 439/449 |
| 2004/0102066 | A1 | 5/2004 | Ortega et al. | 439/83 |
| 2004/0248470 | A1 * | 12/2004 | Wu | 439/637 |
| 2005/0227534 | A1 * | 10/2005 | Nakano | 439/566 |

FOREIGN PATENT DOCUMENTS

| | | |
|---|---|---|
| JP | 2000-003744 | 1/2000 |
| JP | 2000-003745 | 1/2000 |
| JP | 2000-003746 | 1/2000 |
| WO | WO 01/29931 A1 | 4/2001 |
| WO | WO 01/39332 A1 | 5/2001 |

* cited by examiner

STRAIN RELIEF FOR BALL GRID ARRAY CONNECTORS

FIELD OF THE INVENTION

The invention relates generally to electrical connectors. More specifically, the invention relates to relieving strain on electrical connectors connected to substrates.

BACKGROUND OF THE INVENTION

Surface mounted electrical connectors may include strain relief mechanisms. Known strain relief mechanisms may take the form of connector posts that extend into a surface of a mounting substrate. However, creating post receiving through holes in a printed circuit board (PCB) is not acceptable in some applications because of the extra manufacturing step and the reduction in usable board space. Therefore, other connectors include a surface mounted strain relief member. For example, U.S. Pat. No. 4,969,829 discloses a strain relief tab that is surface mounted to a substrate.

These strain relief concepts are used to compensate for coefficient of thermal expansion (CTE) mismatches, which in turn can cause electrical connectivity breaks at the intersection of the connector contacts and the surface of the PCB. However, surface mounted connectors may also be subjected to uni-directional shear load forces caused by orthogonally mated boards, such as a vertical motherboard connector connected to an orthogonally mated daughter card. This shear load force, which is a function of the mass of the orthogonally mated daughter card, the length of the card with respect to the connection, and gravity, can impart a significant shear force on connectors that are surface mounted to the motherboard. Therefore, there is a need for a surface mounted strain relief member that can retard CTE mismatches and carry a shear load.

SUMMARY OF THE INVENTION

The invention includes a strain relief device for mounting on a surface of a substrate, wherein the strain relief device is designed to carry a shear load in addition to compensating for CTE mismatches. In one embodiment, the strain relief device may include a spring beam end that deflects during insertion into the strain relief housing and a mount end that may define solder receiving orifices. The resilience of the spring beam and mount end of the device help, alone or in combination, to provide a vertical connector with resistance against a shear force created by an orthogonally connected daughter card. The modularity and flatness of the strain relief device also helps to decrease manufacturing and production costs.

The direction of deflection may be perpendicular to a direction of insertion. The deflection may be caused by protrusions on the spring beam abutting walls of a slot in the strain relief housing. When the insert is fully received in the housing, the slot may be shaped such that the protrusions do not abut the walls and the spring beam may return to a relaxed state, locking the insert in the strain relief housing. The insert may also include a plate portion perpendicular to the spring beam such that the plate portion abuts the strain relief housing, preventing the insert from moving in the direction of insert. The plate portion additionally may be soldered to a substrate to secure the strain relief device to the substrate.

In an alternative embodiment, an end of the strain relief insert may be inserted into the housing in a direction of insertion until straight beams extending from the insert in a direction perpendicular to the direction of insertion abut shoulders in the slot in the housing. When the beams abut the slot shoulders, the insert may not move further in the direction of insertion, and the end of the insert may extend beyond the strain relief housing. This end may be deformed or bent so that it is perpendicular to the direction of insertion, thus preventing the insert from moving in a direction opposite the direction of insertion. The deformed or bent end may be soldered to a substrate, thereby attaching the strain relief device to the substrate.

DETAILED DESCRIPTION OF ILLUSTRATIVE EMBODIMENTS

Figure 1A:
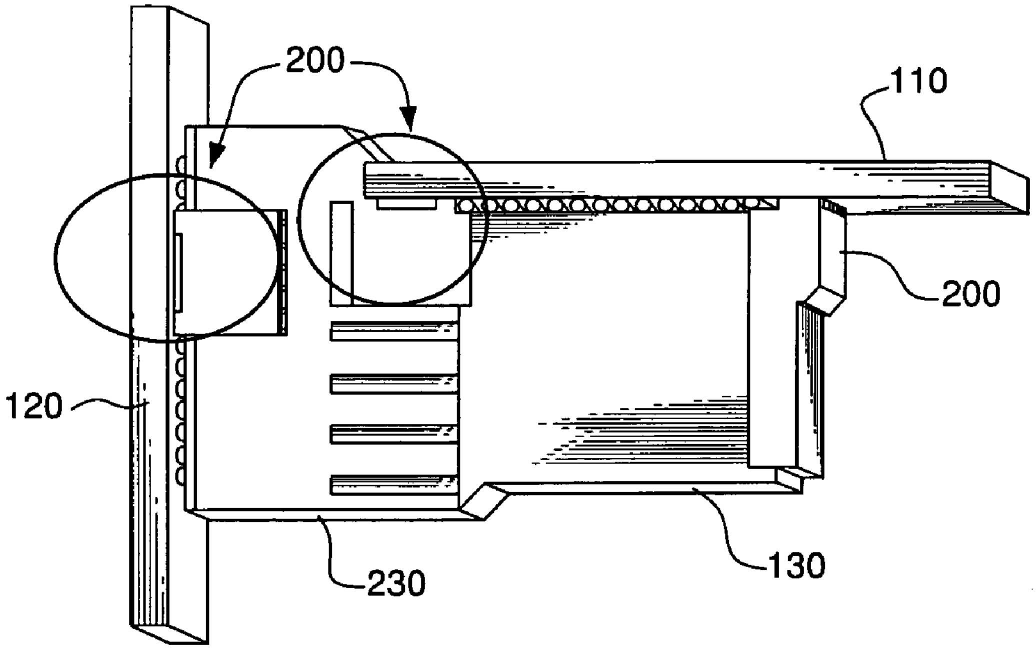
FIGS. 1A and 1B depict perspective views of example strain relief devices attached to an electrical connector and connected to respective substrates.
Figure 1B:
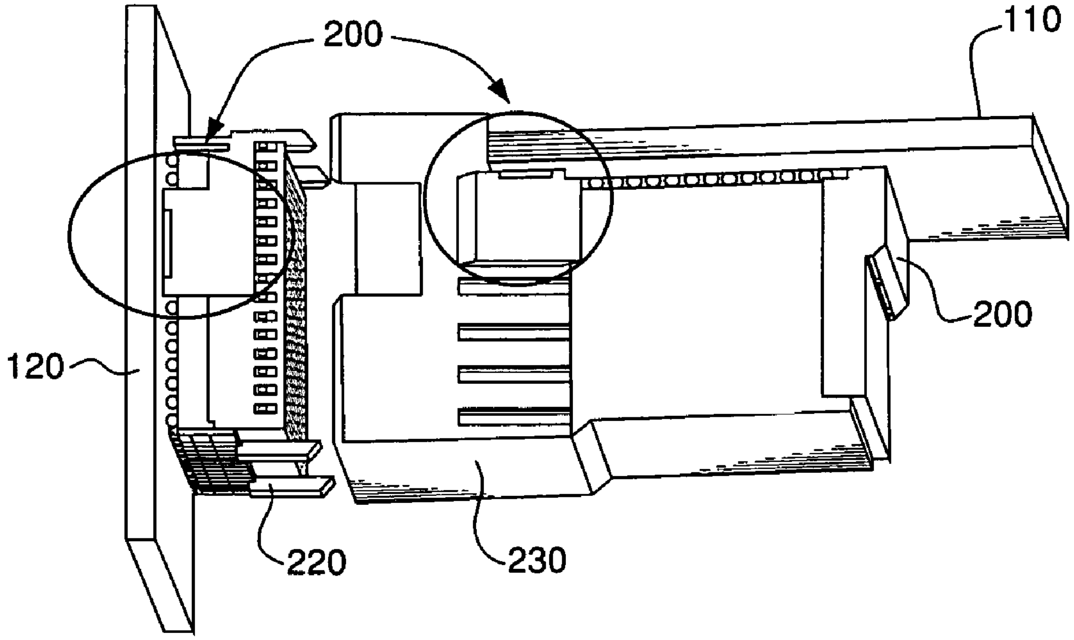

FIGS. 1A and 1B are perspective views of example strain relief devices 200 connected to respective substrates 110, 120. FIG. 1A shows an electrical connector 130 connecting a substrate 110 to a substrate 120. FIG. 1B depicts an exploded view of the electrical connector 130. The electrical connector 130 may include a receptacle portion 220 and a header portion 230. The receptacle portion 220 may be connected to a substrate 120 such as, for example, a mother board. The header portion may be connected to a substrate 110 such as, for example, a daughter card. That is, the electrical connector 130 may electrically connect a daughter card to a mother board. Those skilled in the art, however, will recognize that embodiments of the invention may be used in any electrical connections between an electrical connector and a substrate.

The electrical connector 130 may include the strain relief devices 200. Such devices may be attached to or formed as part of a housing of the electrical connector 130 or, more specifically, a housing of the receptacle portion 220 or the header portion 230. The strain relief devices 200 may be connected to the substrates 110, 120 to which the electrical connector 130 is connected.

Figure 2A:
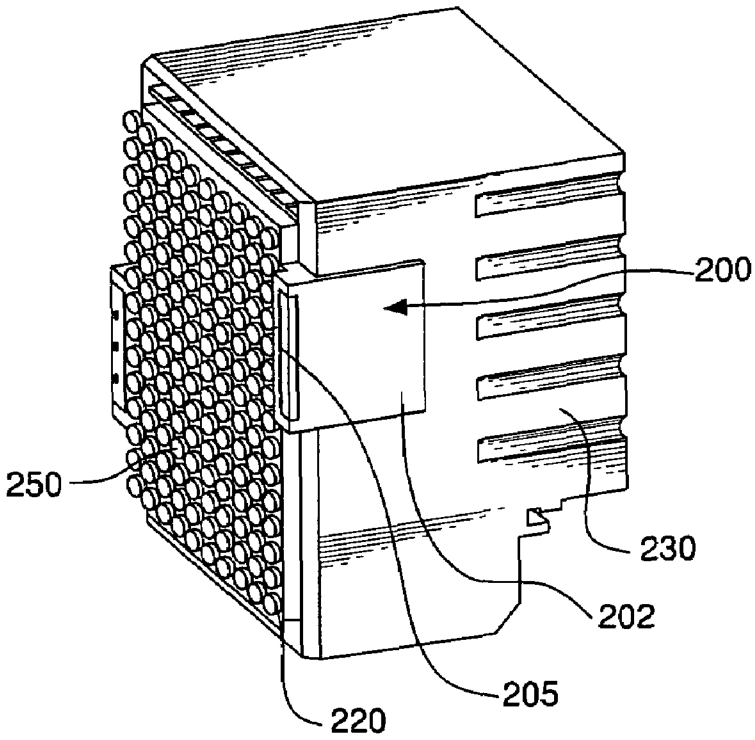
FIG. 2A depicts a perspective view of an example strain relief device attached to or formed as a part of a header portion that is attached to a receptacle portion.
Figure 2B:
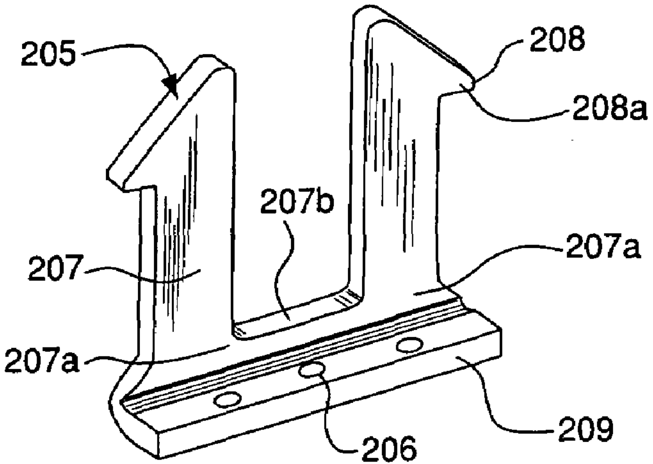
FIG. 2B is a perspective view of an example embodiment of a strain relief insert.
Figure 2C:
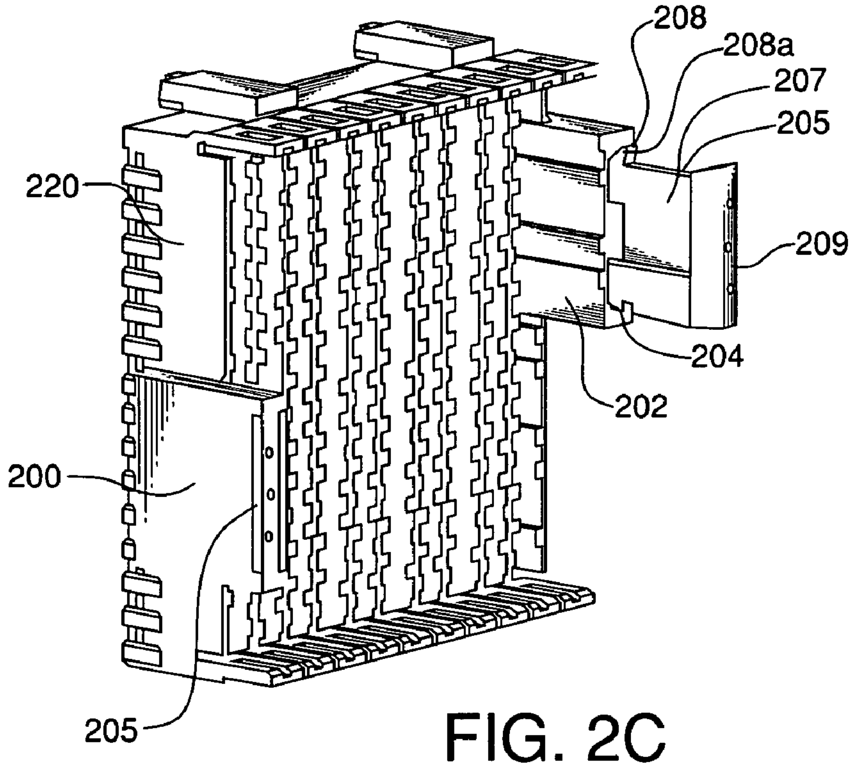
FIG. 2C depicts a perspective view of an example strain relief device with an example strain relief insert being received in a strain relief housing.
Figure 2D:
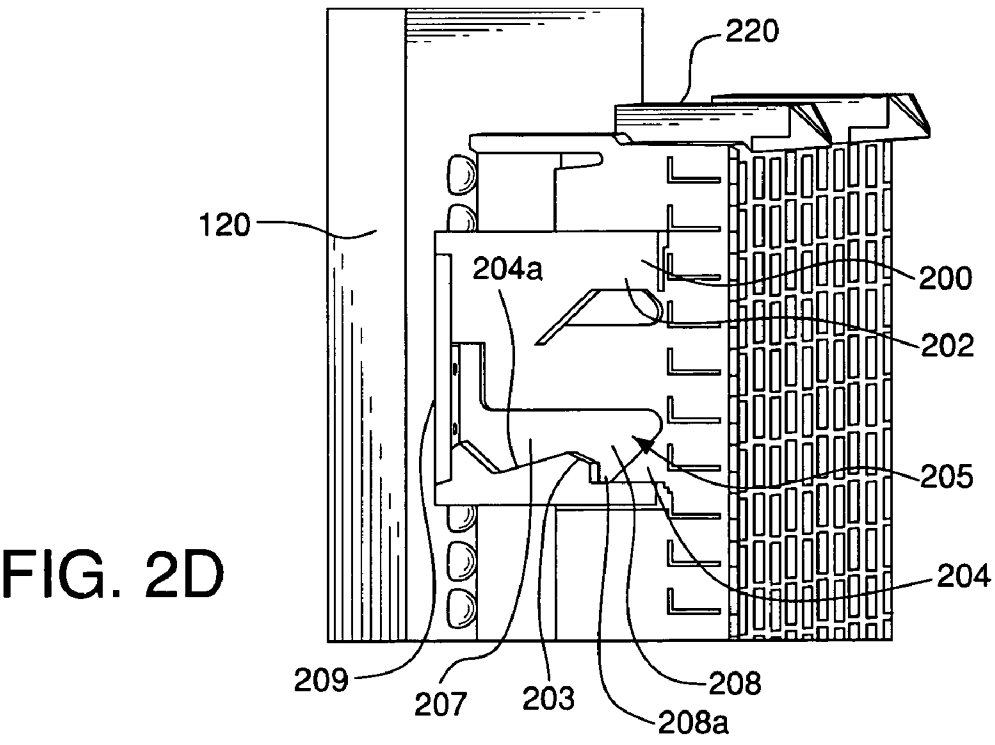
FIG. 2D depicts a cutaway perspective view of an example strain relief device.

FIGS. 2A, 2B, 2C, and 2D depict perspective views of the example strain relief device 200 and an example strain relief insert 205. FIG. 2A depicts a perspective view of the example strain relief device 200 attached to or formed as a part of a receptacle portion 220 that is attached to a header portion 230 of a connector such as the connector 130. FIG. 2B is a perspective view of the example strain relief insert 205. FIG. 2C depicts a perspective view of the example strain relief device 200 with the example strain relief insert 205 being received in a strain relief housing 202. FIG. 2D depicts a cutaway perspective view of the example strain relief device 200.

The strain relief device 200 may include the strain relief housing 202 and the strain relief insert 205. The strain relief insert 205 may be inserted into and thus received in the strain relief housing 202. The strain relief device 200 may be attached to or molded as part of a housing of a connector such as the connector 130 or, more specifically, to the housing of a receptacle portion 220 or a header portion 210 of a connector. The strain relief insert 205 may be received and locked in the strain relief housing 202 such the insert 205 may not be removed or may be removed only with the use of a mechanism to unlock the insert 205 from the strain relief housing 202. Once received in the strain relief housing 202, the strain relief insert 205 may be disposed to be soldered to a respective location on a substrate, such as the substrate 120, when solder balls 250 attached to individual contacts (not shown) in a connector 130 are soldered to the substrate.

The strain relief housing 202 may include a slot 204 into which the strain relief insert 205 may be inserted. The slot 204 and the insert 205 may each be in a complementary shape to lock and hold the insert 205 in the strain relief housing 202. The strain relief insert 205 may include, for example, one or more spring beams 207 for insertion into the strain relief housing 202 and a plate portion 209 that extends in a direction perpendicular to a direction of insertion into the strain relief housing 202. Additionally, respective ends 207*a* of the spring beams 207 may be connected by a body 207*b* such that the spring beams 207 form a "U" shape, as best seen in FIG. 2B.

The spring beams 207 may extend from the body 207*b* in a first direction and may each include an extension, that is, protrusion 208 extending in a direction perpendicular to the first direction. The protrusion 208 may form a shoulder 208*a* on the spring beam 207. During insertion of the strain relief insert 205 into the strain relief housing 202, the protrusions 208 may press against walls 204*a* of the slot 204, forcing the spring beams 207 to deflect toward each other, that is, in a direction perpendicular to the first direction. The deflection may also be perpendicular to a direction of insertion. The spring beams 207 may be inserted into the strain relief housing 202 until the plate portion 209 abuts the strain relief housing 202. When the plate portion 209 abuts the strain relief housing 202, the protrusions 208 may extend past a complementary slot shoulder 203 in the slot 204. When the protrusions 208 extend past the slot shoulder 203, the deflected spring beam 207 may return to a relaxed, undeflected state as the protrusions 208 no longer abut respective walls 204*a* of the slot 204 to cause the spring beams 207 to deflect. This may best be seen in FIG. 2D.

When each of the spring beams 207 returns to a relaxed state, the strain relief insert 205 may be locked in the strain relief housing 202, preventing the insert 205 from being moved in a direction opposite the direction of insertion (i.e., preventing the insert 205 from being removed from the strain relief housing 202). Additionally, the plate portion 209 and the strain relief housing may cooperate to prevent the strain relief insert 205 from moving any farther in the direction of insertion as the plate portion 209 abuts the strain relief housing 202. It should be understood that the direction of insertion of the strain relief insert 205 may be away from a substrate to which the insert 205 may be connected. The strain relief insert 205 may be locked in the strain relief housing 202 in the absence of barbs, spurs, or other mechanisms used to cut into the spring relief housing 202.

After the strain relief insert 205 is received in the strain relief housing 202, the strain relief device 200 may be soldered or otherwise connected to a substrate such as a printed circuit board. The plate portion 209 may be soldered to the substrate when the solder balls 250 are soldered to the substrate. The plate portion 209 may include solder holes 206 that may be used to firmly solder the strain relief device 200 to the substrate.

The strain relief housing 202 may be constructed of a suitable material such as plastic or of the same material as the housing of the electrical connector 130 to which it is attached. Alternatively, the strain relief housing 202 may be molded as part of the housing of the electrical connector 130. The strain relief insert 205 may be constructed of a conductive material or a material otherwise amenable to being soldered to a substrate. The spring beams 207 and the plate portion 209 may be stamped or otherwise formed from a sheet of conductive material. The plate portion 209 may be bent or deformed such that it is perpendicular to the spring beams 207 before inserting into the strain relief housing.

FIGS. 3A, 3B, 3C, and 3D depict bottom views of electrical connectors showing another example embodiment of a strain relief device 300 and example methods of configuring the strain relief devices 300. The strain relief device 300 may be substantially similar to the strain relief device 200 but may include two strain relief inserts 305*a*, 305*b* received in respective slots instead of one insert as shown with regard to the strain relief device 200. This doubling of the strain relief inserts may allow for a longer strain relief connection with a substrate without detrimentally increasing the strain relief footprint on the substrate.

Figure 3A:
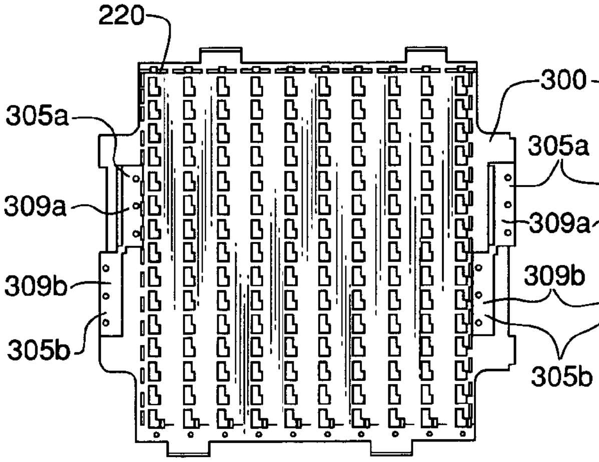
FIGS. 3A, 3B, 3C, and 3D depict bottom views of electrical connectors showing an alternative example embodiment of a strain relief device and alternative example methods of configuring the strain relief device.
Figure 3B:
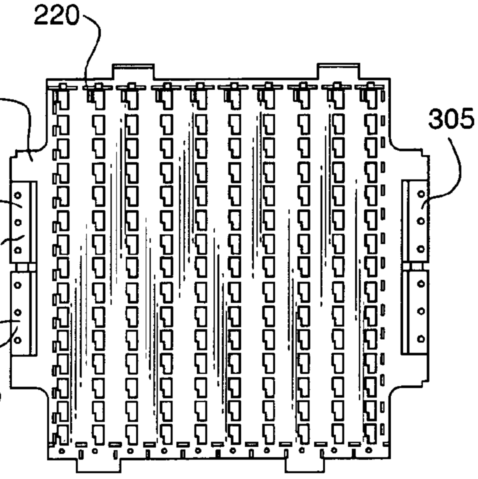
Figure 3C:
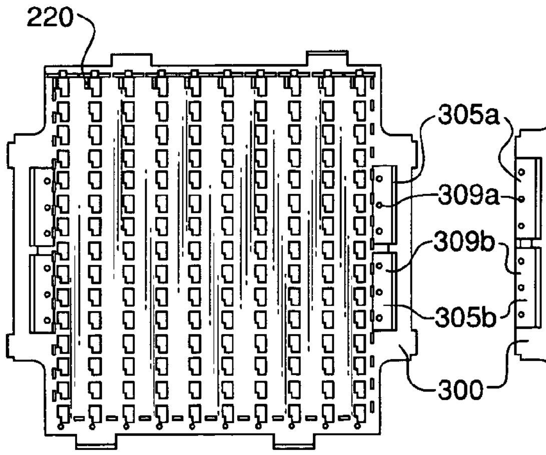
Figure 3D:
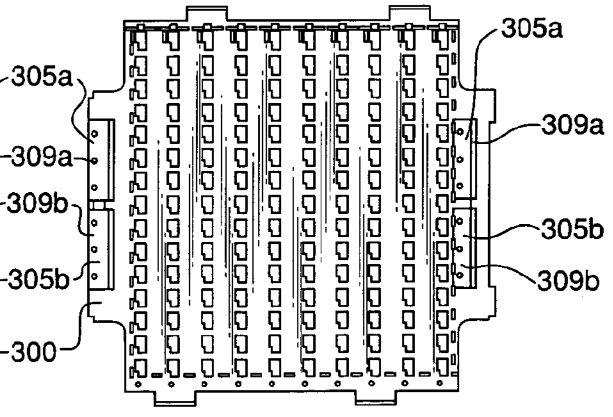

The strain relief device 300 may be configured in various ways to provide optimal strain relief for an application. As shown in FIG. 3A, the strain relief inserts 305*a*, 305*b* may be positioned such that a plate portion 309*a* faces towards the receptacle portion 220, while the adjacent plate portion 309*b* faces away from the receptacle portion 220. As shown in FIGS. 3B and 3C, the strain relief inserts 305*a*, 305*b* may be positioned such that the plate portions 309*a*, 309*b* may face away from (FIG. 3B) or toward (FIG. 3C) the receptacle portion 220. FIG. 3D shows that the strain relief inserts 305*a*, 305*b* may be positioned such that the plate portions 309*a*, 309*b* on one side of the receptacle portion 220 may face away from the receptacle portion and the plate portions 309*a*, 309*b* on the opposite side of the receptacle portion 220 may face toward the receptacle portion 220. Such positioning may be equally applicable on the header portion 210 of the electrical connector 130 or on any other type of electrical connector.

Figure 4A:
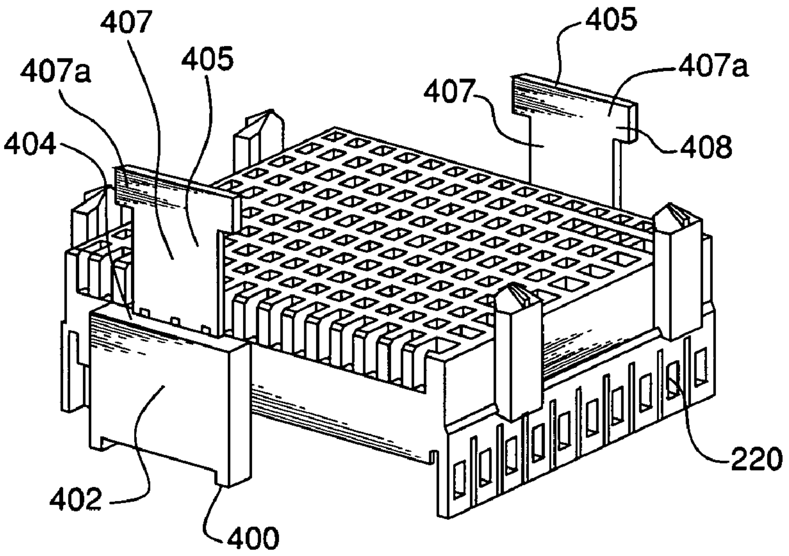
FIG. 4A depicts a perspective view of an alternative example strain relief device with an example strain relief insert partially received in a strain relief housing.
Figure 4B:
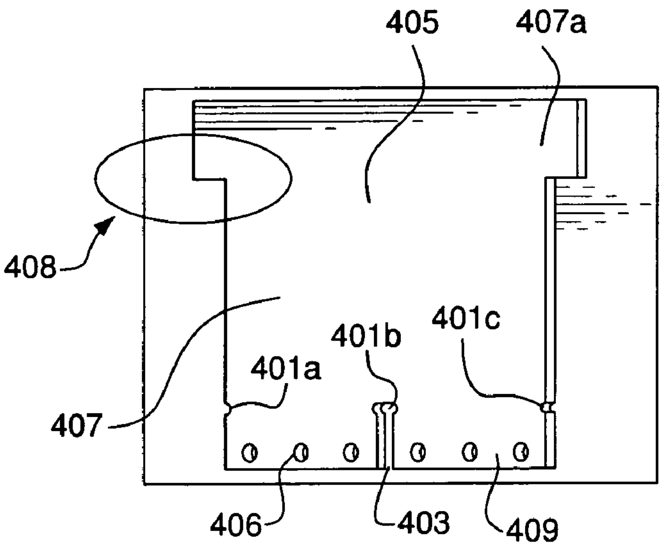
FIG. 4B is a perspective view of an alternative example strain relief insert.
Figure 4C:
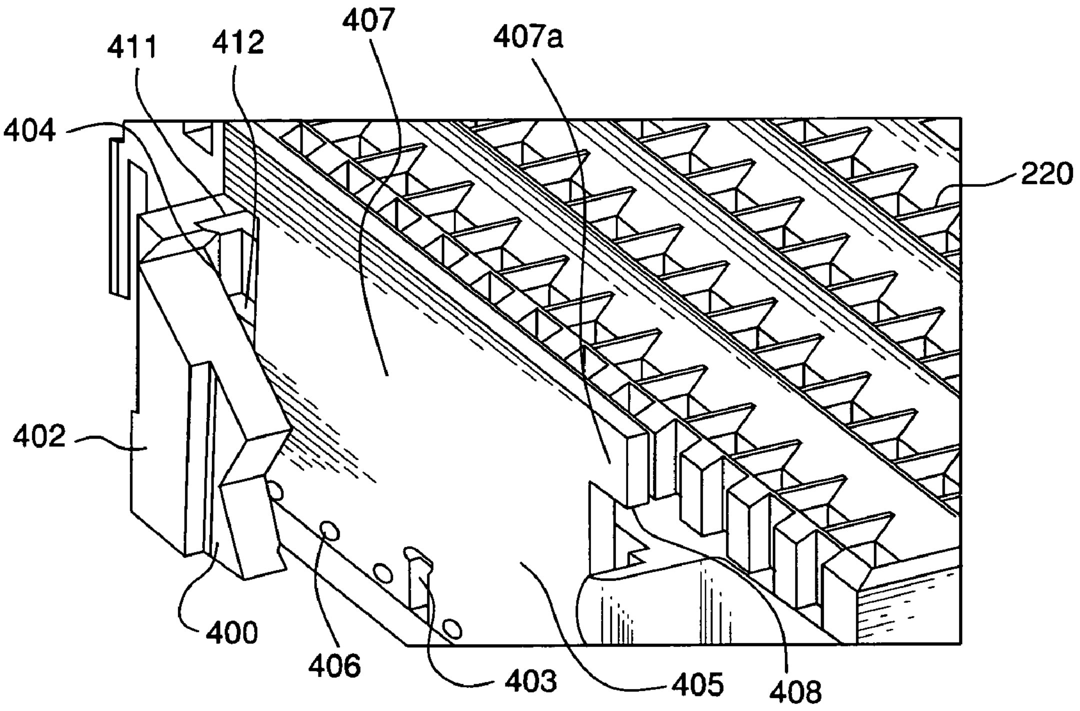
FIG. 4C depicts a perspective view of an alternative example strain relief device with an example strain relief insert partially received in a strain relief housing.
Figure 4D:
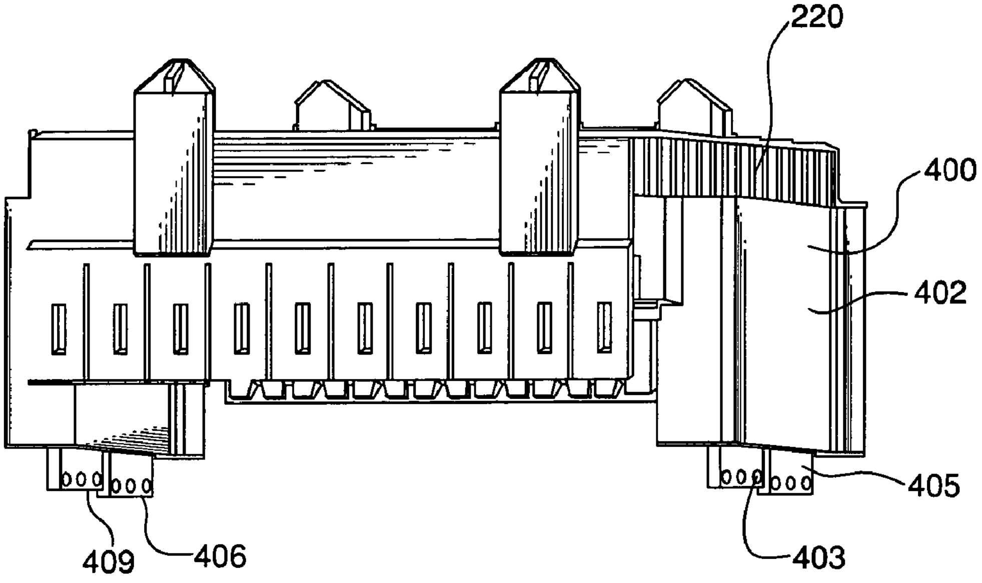
FIG. 4D depicts a perspective view of an alternative example strain relief device with a strain relief insert received in the strain relief housing.

FIGS. 4A, 4B, 4C, and 4D depict perspective views of an alternative example strain relief device 400 and an alternative example strain relief insert 405. FIG. 4A is a perspective view of the example strain relief device 400 with the example strain relief insert 405 partially received in a strain relief housing 402. FIG. 4B is a perspective view of the example strain relief insert 405. FIG. 4C is a perspective view of the example strain relief device 400 with the example strain relief insert 405 partially received in the strain relief housing 402. FIG. 4D is a perspective view of the example strain relief device 400 with the strain relief insert 405 received in the strain relief housing 402.

The strain relief device 400 may include the strain relief housing 402 and the strain relief insert 405. The strain relief device 400 may be attached to a housing of a connector such as the connector 130 or, more specifically, to the housing of a receptacle portion 220 or a header portion 210 of a connector. The strain relief insert 405 may be inserted into and thus received in the strain relief housing 402. The strain relief housing 402 thus may include a slot 404 into which the strain relief insert 405 may be received, as may best be seen in FIG. 4C. A direction of insertion may be towards a substrate to which the strain relief insert 405 may be connected.

The strain relief insert 405 may be include a body 407 extending in a first direction with beams 407*a* extending in a direction perpendicular to the first direction. The beams 407*a* may form an insert shoulder 408 that may correspond to a shoulder 412 in the slot 404 of the strain relief housing 402. This may best be seen in FIG. 4C. The complementary shapes of the insert 405 and the slot shoulders 412 may create a positive stop, preventing the insert 405 from moving in the direction of insertion when the slot shoulder 412 abuts the insert shoulder 408.

After the strain relief insert 405 is received in the strain relief housing 402 and the insert shoulder 408 abuts the slot shoulder 412, plate portions 409 of the strain relief insert 405 may extend beyond the strain relief housing 402. This may best be seen in FIG. 4D. The plate portions 409 of the insert may be bent or deformed by any suitable method and with any suitable tool such that the plate portions 409 abut the strain relief housing 402. This may be best seen in FIGS. 4E-4H. In this way, the strain relief insert 405 may be prevented from being moved in a direction opposite the direction of insertion (i.e., from being removed from the strain relief housing 402). Additionally, the plate portions 409 may be suitably located to be soldered to respective locations on a substrate, and may include solder holes 406 to facilitate soldering.

As may best be seen in FIG. 4B, the strain relief insert may include reliefs 401*a*, 401*b*, 401*c* to aid in bending the plate portion 409 to facilitate providing a snug abutment of the plate portions 409 against the strain relief housing 402. Additionally, the plate portion 409 may include a plate portion slot 403 to allow for easier bending of the slot portion and also to enable the strain relief device 400 to be configures in various ways for optimal strain relief. Various configurations are depicted in FIGS. 4E-4H.

Figure 4E:
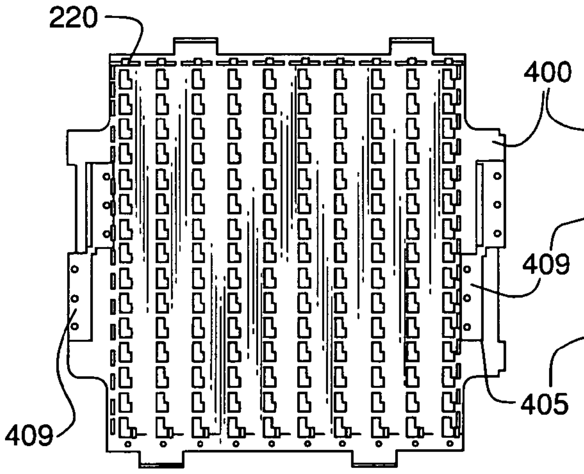
FIGS. 4E, 4F, 4G, and 4H depict bottom views of electrical connectors showing alternative example methods of configuring an alternative strain relief device.
Figure 4F:
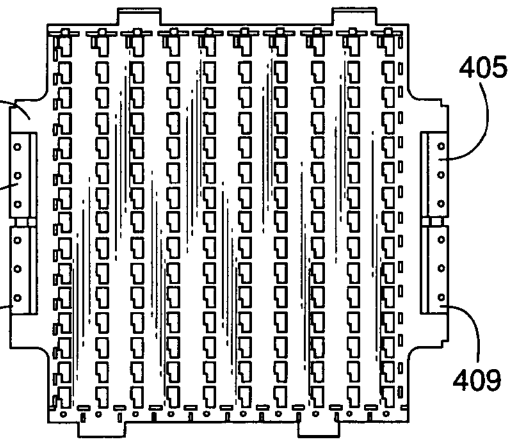
Figure 4G:
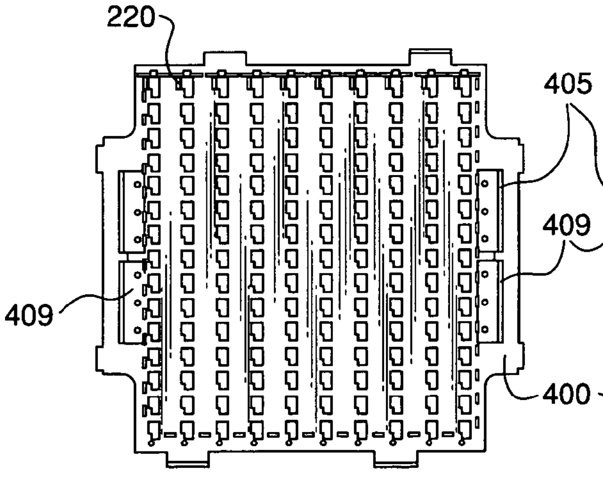
Figure 4H:
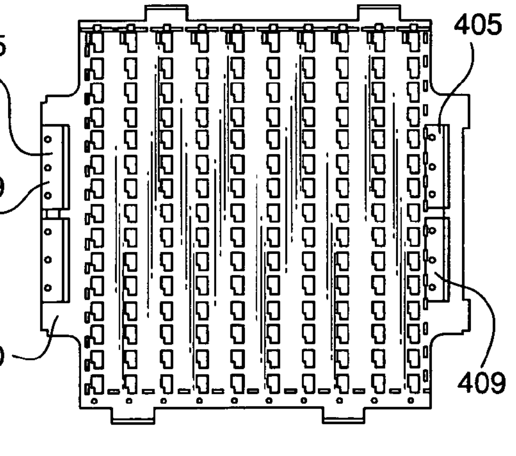

As shown in FIG. 4E, the plate portion 409 may be bent or deformed such that half of the plate portion 409 faces towards the receptacle portion 220, while the other half faces away from the receptacle portion 220. As shown in FIGS. 4F and 4G, the plate portion 409 may be configured such both halves face away from (FIG. 4F) or toward (FIG. 4G) the receptacle portion 220. FIG. 4H shows that the plate portions 209 on both sides of the receptacle portion 220 may be bent or deformed in the same direction such that the plate portion 409 on one side of the receptacle portion 220 may face away from the receptacle portion and the plate portion 409 on the opposite side of the receptacle portion 220 may face toward the receptacle portion 220. Such configurations may be equally applicable on the header portion 210 of the electrical connector 130 or on any other type of electrical connector.

The strain relief housing 402 may be constructed of a suitable material such as plastic or of the same material as the housing of the electrical connector 130 to which it is attached. Alternatively, the strain relief housing may be molded as part of the housing of the electrical connector 130. The strain relief insert 405 may be constructed of a conductive material or a material otherwise amenable to being soldered to a substrate. The strain relief insert 405 may be stamped or otherwise formed from a sheet of conductive material.

Figure 5A:
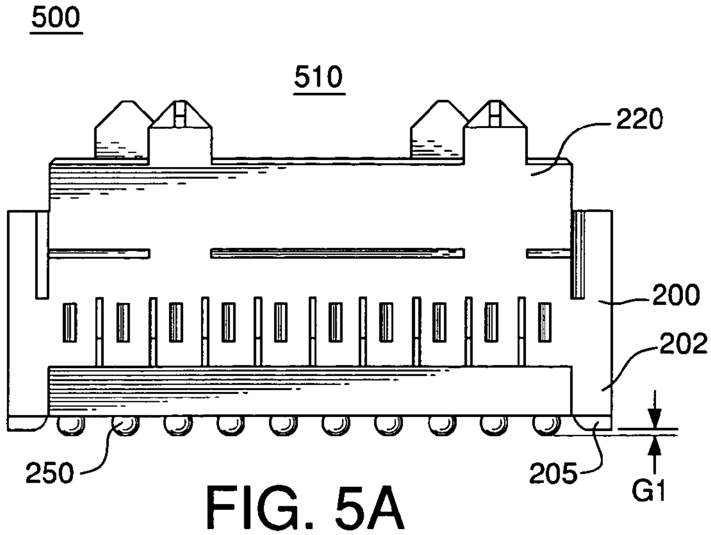
FIGS. 5A, 5B, and 5C depict an example method of attaching an example embodiment of a strain relief housing to a substrate when contacts in a receptacle portion of a connector are attached to the substrate.
Figure 5B:
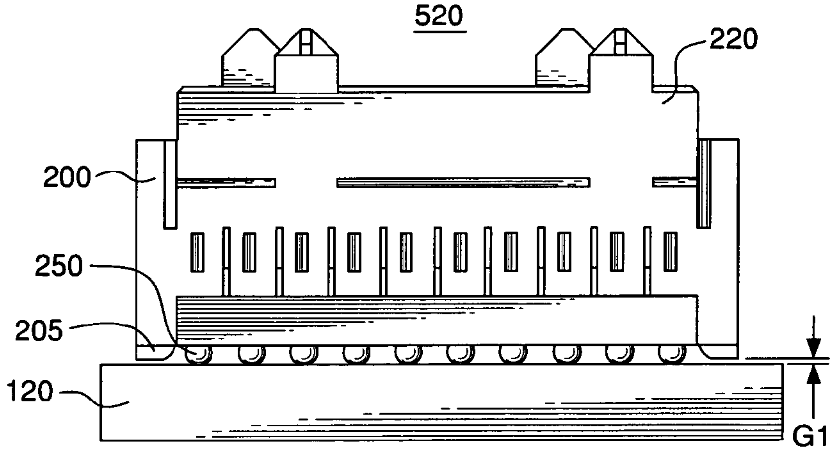
Figure 5C:
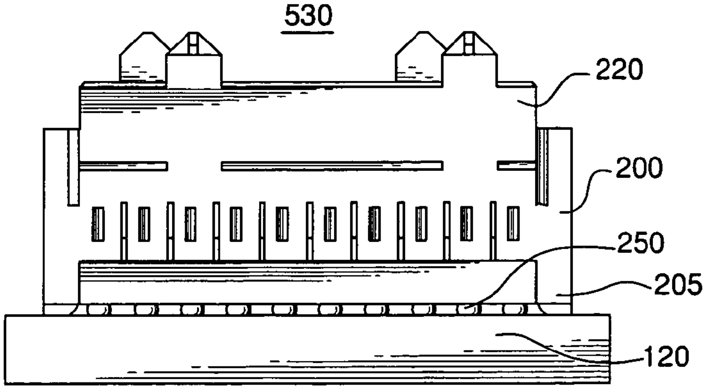

FIGS. 5A, 5B, and 5C depict an example method 500 of attaching the strain relief housing 200 to the substrate 120 when solder balls 250 of a ball grid array of the receptacle portion 220 are attached to the substrate 120. At step 510, the strain relief insert 205 may be received in the strain relief housing 202. At step 520, the receptacle portion 220 may be placed on the substrate 120. The solder balls 250 may abut the substrate 120. A gap G1 may form between the strain relief device 200 and the substrate 120. At step 530, reflow of the solder balls 250 may commence and, as the solder balls 250 are reflowed to the substrate 120, the gap G1 may decrease until the strain relief device 200 abuts the substrate 120. That is, the gap G1 may account for a distance that the receptacle portion 220 may move towards the substrate 120 during reflow. Upon completion of reflow or when the strain relief device 200 abuts the substrate 120, the strain relief device 200 may be soldered to the substrate 120. The method 500 may be equally applicable to other strain relief devices such as, for example, the strain relief devices 300, 400.

Figure 6A:
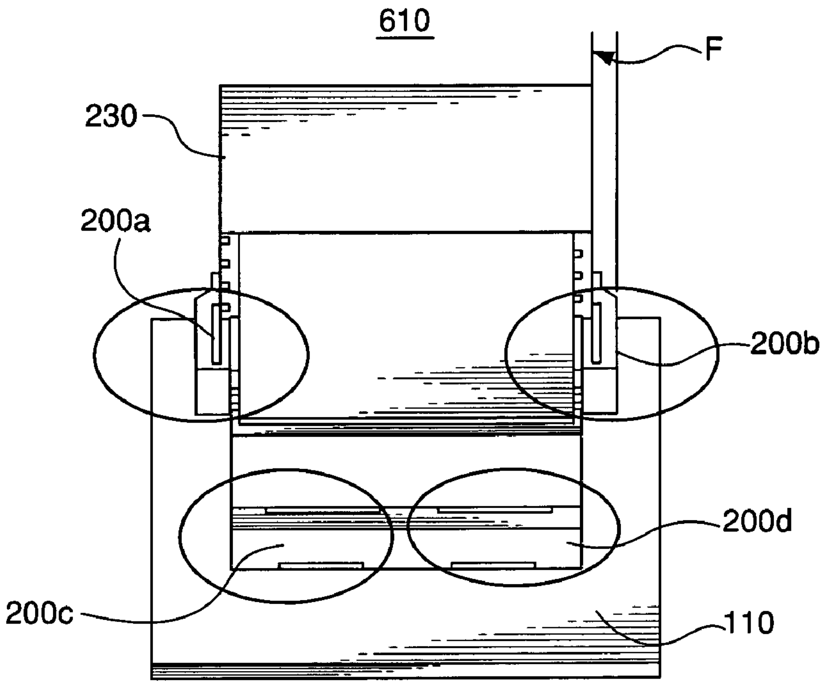
FIGS. 6A and 6B depict perspective views of a header portion of an electrical connector with alternative example configurations of strain relief devices to minimize footprints of the devices on a substrate.
Figure 6B:
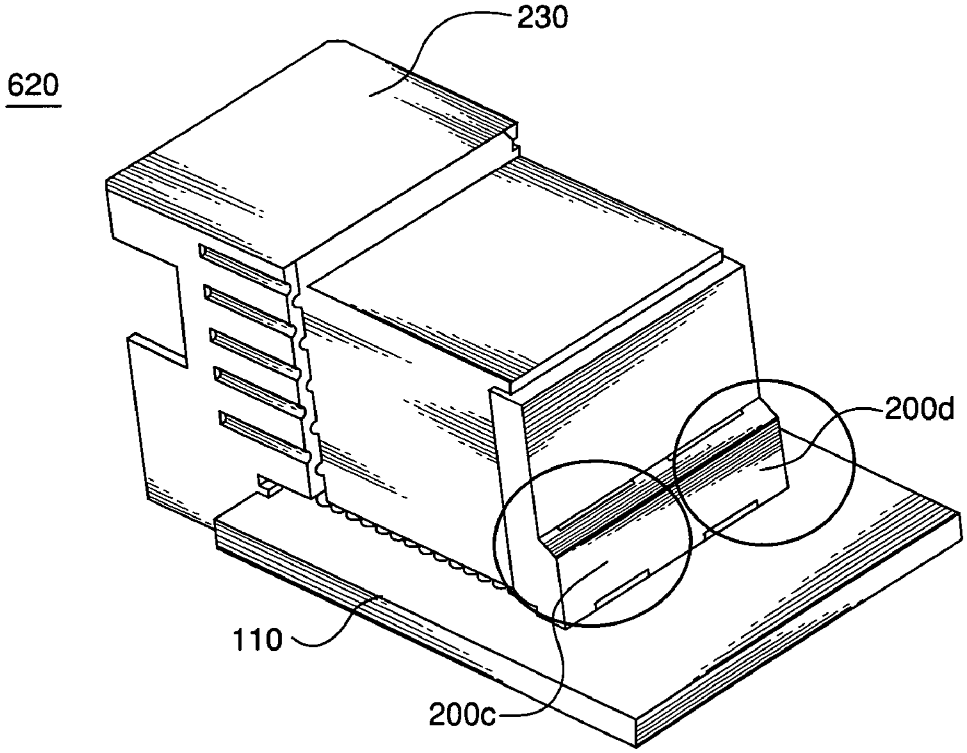

FIGS. 6A and 6B depict perspective views of the header portion 230 with alternative example configurations of strain relief devices 200 to minimize footprints of the devices 200 on a substrate 110. FIG. 6A depicts a perspective view of an example header portion 230 with four strain relief devices 200*a*, 200*b*, 200*c*, 200*d*. One or more respective strain relief devices 200*a*, 200*b* may be located on each side of the header portion 230, and one or more respective strain relief devices 200*c*, 200*d* may be located on an end of the header portion 230 that abuts the substrate 110. The distance F that a footprint of a strain relief device 200*b* extends beyond the footprint of the housing of the header portion 230 may be minimized through the design of the strain relief devices, 200, 300, 400 described herein. The distance F may be, for example, 0.3-1.5 mm.

FIG. 6B depicts a perspective view of an example header portion 230 with two strain relief devices 200*c*, 200*d*. The strain relief devices 200*c*, 200*d* may be located on the end of the header portion 230 that abuts the substrate 110. In this way, the connector pitch of the substrate 110 may not be affected by the addition of the strain relief devices 200*c*, 200*d*.

Thus there have been described systems and methods for improved strain relief devices for electrical connectors. It is to be understood that the foregoing illustrative embodiments have been provided merely for the purpose of explanation and are in no way to be construed as limiting of the invention. For example, the strain relief devices may be attached to other connector types, not just to those including a receptacle portion and a header portion. Words which have been used herein are words of description and illustration, rather than words of limitation. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention in its aspects.

What is claimed:

1. A strain relief device for an electrical connector, comprising:

a housing adapted for connection to the electrical connector; and an insert received in the housing and comprising a plate portion adapted to be surface mounted on a substrate, wherein the insert further comprises a spring beam extending in a first direction and defining a plane, wherein the spring beam is adapted for insertion into the housing and is adapted to deflect in a direction perpendicular to the first direction during insertion into the housing, and wherein the plate portion is further adapted to abut the housing to prevent the insert from moving in the first direction.

2. The strain relief device of claim 1, wherein the spring beam is further adapted to deflect in a direction parallel to the plane.

3. The strain relief device of claim 1, wherein the spring beam comprises a protrusion extending in the direction perpendicular to the first direction, and wherein the protrusion and the housing are adapted to deflect the spring beam during insertion of the spring beam into the housing.

4. The strain relief device of claim 1, wherein the plate portion is perpendicular to the spring beam.

5. The strain relief device of claim 1, wherein the housing comprises a slot for receiving the spring beam.

6. The strain relief device of claim 5, wherein the slot is shaped to allow the spring beam to return to a relaxed state when the insert is received in the housing.

7. The strain relief device of claim 1, wherein the insert and the housing are adapted to lock the insert in the housing.

8. The strain relief device of claim 1, wherein the electrical connector comprises a side housing, wherein the housing of the strain relief device is attached to the side housing of the electrical connector, and wherein the strain relief device extends in a direction perpendicular to the side housing a distance equal to or between 0.3 and 1.5 mm.

9. The strain relief device of claim 1, wherein the electrical connector comprises a side housing and a plurality of solder balls that define a second plane, wherein the housing of the strain relief device is attached to the side housing of the electrical connector, wherein a gap between the strain relief device and the second plane is formed in a direction perpendicular to the second plane, and wherein the gap is equal to a distance that the electrical connector moves toward the substrate during reflow of the plurality of solder balls.

10. The strain relief device of claim 1, wherein the plate portion is perpendicular to the spring beam and parallel to the substrate, and wherein the plate portion is adapted to be solderably connected to the surface of the substrate.

11. The strain relief device of claim 10, wherein the plate portion defines at least one solder hole.

12. A strain relief device for an electrical connector, comprising:

a housing adapted for connection to the electrical connector; and an insert for insertion in the housing, wherein the insert comprises a first end adapted to be inserted through the housing in a direction of insertion and to extend beyond the housing, wherein the insert comprises a first shoulder and the housing comprises a second shoulder wherein the first and second shoulders are adapted to prevent the insert from moving in the direction of insertion, and wherein the first end is also adapted to be deformed after insertion in the housing such that at least a portion of the first end is adapted to abut the housing to prevent the insert from moving in a direction opposite to the direction of insertion.

13. The strain relief device of claim 12, wherein the first end is deformed such that it extends in a direction perpendicular to the direction of insertion.

14. The strain relief device of claim 13, wherein a first half of the first end is deformed in a direction towards the electrical connector and a second half of the first end is deformed in a direction away from the electrical connector.

15. The strain relief device of claim 12, wherein the insert comprises a body extending in a first direction, wherein the first and second shoulders extend in a direction perpendicular to the first direction, and wherein the first and second shoulders abut one another to prevent the insert from moving in the direction of insertion.

16. The strain relief device of claim 12, wherein the first end is adapted to be soldered to a substrate.

17. The strain relief device of claim 12, wherein the electrical connector comprises a side housing, wherein the housing of the strain relief device is connected to the side housing of the electrical connector, and wherein the strain relief device extends in a direction perpendicular to the side housing a distance equal to or between 0.3 and 1.5 mm.

18. The strain relief device of claim 12, wherein the first end comprises a plate portion that is adapted to be bent after the insert is received in the housing and to abut the housing.

19. The strain relief device of claim 18, wherein the plate portion comprises a slot partitioning the plate portion into a first half and a second half, and wherein the slot enables the first and second halves of the plate portion to be deformed in opposite directions with respect to one another.

20. An electrical connector, comprising:

a strain relief housing; and a strain relief insert comprising:

a body extending in a first direction;

a beam extending from the body in a direction perpendicular to the first direction; and a plate portion extending from the body for soldering to a substrate and defining at least one solder hole, wherein the strain relief insert is adapted for insertion into the strain relief housing, wherein the strain relief housing is adapted to be attached to a side housing of the electrical connector, wherein the electrical connector comprises a plurality of solder balls that define a first plane, wherein a gap between the strain relief insert and the first plane is formed in a direction perpendicular to the first plane, and wherein the gap is substantially equal to a distance that the electrical connector moves toward the substrate during reflow of the plurality of solder balls.

21. The electrical connector of claim 20, wherein the beam is a spring beam adapted to deflect in a direction parallel to the first direction during insertion of the strain relief insert into the strain relief housing.

22. The electrical connector of claim 21, wherein the beam defines a second plane and is further adapted to deflect in a direction parallel to the second plane.

23. The electrical connector of claim 20, wherein the strain relief insert is adapted for insertion into the strain relief housing in the first direction, wherein the beam is adapted to prevent the strain relief insert from moving in the first direction when received in the strain relief housing, and wherein the plate portion is adapted to be bent after the strain relief insert is received in the strain relief housing to prevent the strain relief insert from moving in a direction opposite the first direction.

24. A strain relief device for an electrical connector, comprising:

a housing adapted for connection to the electrical connector; and an insert received in the housing comprising a spring beam extending in a first direction and defining a plane, wherein the spring beam is adapted for insertion into the housing, wherein the spring beam is adapted to deflect in a direction perpendicular to the first direction during insertion into the housing, wherein the electrical connector comprises a side housing and a plurality of solder balls that define a second plane, wherein the strain relief device is attached to the side housing of the electrical connector, wherein a gap between the strain relief device and the second plane is formed in a direction perpendicular to the second plane, and wherein the gap is equal to a distance that the electrical connector moves toward a substrate during reflow of the plurality of solder balls.

25. The strain relief device of claim 24, wherein the spring beam is further adapted to deflect in a direction parallel to the plane.

26. The strain relief device of claim 24, wherein the spring beam comprises a protrusion extending in a direction perpendicular to the first direction, and wherein the protrusion and the housing are adapted to deflect the spring beam during insertion of the spring beam into the housing.

27. The strain relief device of claim 24, wherein the insert further comprises a plate portion perpendicular to the spring beam, and wherein the plate portion is adapted to abut the housing to prevent the insert from moving in the first direction.

28. The strain relief device of claim 24, wherein the housing comprises a slot for receiving the spring beam.

29. The strain relief device of claim 28, wherein the slot is shaped to allow the spring beam to return to a relaxed state when the insert is received in the housing.

30. The strain relief device of claim 24, wherein the insert and the housing are adapted to lock the insert in the housing.

31. The strain relief device of claim 24, wherein the strain relief device extends in a direction perpendicular to the side housing of the electrical connector a distance equal to or between 0.3 and 1.5 mm.

* * * * *